United States Patent [19]

Luck et al.

[11] 4,175,149

[45] * Nov. 20, 1979

[54] MINERAL WOOL PRODUCT CONTAINING HIGH DENSITY SKINS AND METHOD OF MANUFACTURING SAME

[75] Inventors: Allan J. Luck, Harvard; John T. Clarke, St. Charles; Michael R. Hoffman, Elgin, all of Ill.

[73] Assignee: Masonite Corporation, Chicago, Ill.

[*] Notice: The portion of the term of this patent subsequent to Nov. 20, 1979, has been disclaimed.

[21] Appl. No.: 881,551

[22] Filed: Feb. 27, 1978

Related U.S. Application Data

[63] Continuation-in-part of Ser. No. 739,184, Nov. 5, 1976.

[51] Int. Cl.$^2$ ............................ B32B 5/14; B29J 5/04
[52] U.S. Cl. ............................ 428/171; 428/218; 428/236; 428/301; 428/451; 428/452; 428/526; 428/531; 156/62.2; 156/62.8; 156/331; 156/285
[58] Field of Search ............ 156/285, 62.8, 331, 156/62.2; 428/526, 531, 236, 171, 218, 301, 451, 452

[56] References Cited

U.S. PATENT DOCUMENTS

| | | |
|---|---|---|
| 1,663,503 | 3/1928 | Mason. |
| 1,663,504 | 3/1928 | Mason. |
| 1,663,506 | 3/1928 | Mason. |
| 1,812,969 | 7/1931 | Mason. |
| 1,812,970 | 7/1931 | Mason. |
| 3,062,699 | 11/1962 | Raphael et al. ............... 428/531 |
| 3,699,203 | 10/1972 | Oshima et al. ............... 264/113 X |
| 4,007,076 | 2/1972 | Clarke et al. ............... 428/301 |

*Primary Examiner*—P. C. Ives
*Attorney, Agent, or Firm*—Mason, Kolehmainen, Rathburn & Wyss

[57] ABSTRACT

A mineral wool board is manufactured having relatively high density skins by including urea in at least the surface fibers of a consolidated mineral wool fiberboard containing cellulosic fibers and/or starch and then hot-pressing the consolidated board at a temperature of at least 525° F. to form a board having high density surface skins.

39 Claims, No Drawings

4,175,149

MINERAL WOOL PRODUCT CONTAINING HIGH DENSITY SKINS AND METHOD OF MANUFACTURING SAME

CROSS-REFERENCE TO RELATED APPLICATION

This application is a continuation-in-part of our co-pending application Ser. No. 739,184 filed Nov. 5, 1976, which is hereby incorporated by reference.

FIELD OF THE INVENTION

The present invention relates to a mineral wool board having hard, dense surface portions. More particularly, the present invention relates to a method of manufacturing a board containing predominantly mineral wool by including cellulosic fibers and/or starch in the mineral wool mat, consolidating the mineral wool mat to form a mineral wool board, contacting the surface of the board with urea and post-pressing the consolidated mineral wool board at a temperature of at least 525° F., thereby causing the urea, or urea decomposition products, to interact with the cellulosic fibers or starch in the surface of the mineral wool board to densify the surface portions into smooth, stiff, hard, scratch-resistant, dense skins.

BACKGROUND OF THE INVENTION

The process of the present invention relates to a "post-press" or "after-consolidation" press operation for creating thick, hard, integral surface portions on at least one and preferably both major surfaces of a mineral wool containing board. As set forth in our prior co-pending application Ser. No. 739,184 filed Nov. 5, 1976, when the surface cellulosic fibers of a man-made board are contacted with urea and the board is thereafter post-press embossed at a high temperature on the order of 525°-600° F., a hard, dense, scratch-resistant skin is formed on the urea contacted surface. In accordance with the present invention, it has been found that the same surface effect can be obtained with a mineral wool board so long as the surface of the board, defined by the first 0.030 inch thickness of the board, contains cellulosic fibers and/or starch. The creation of a hard, dense, scratch-resistant surface portion on a mineral wool board unexpectedly increases the strength of the board and enables the consolidated board to be embossed with a decorative embossing plate to achieve deep, and decorative designs in the surface of the board with excellent design fidelity, strength, scratch-resistance and very little spring-back of the surface design.

PRIOR ART

Mineral wool boards have been noted for their excellent fire retardancy, but heretofore it has been impossible to provide a mineral wool board having predominantly mineral wool fibers with strength and scratch-resistance sufficient for the purpose of such uses as wall panelling (note, however, the Clapp U.S. Pat. No. 2,273,313, page 2, column 2, line 22). Many prior art patents teach cellulosic fibers with mineral wool fibers for the purpose of adding strength to a mineral wool board. For example, the following U.S. Pat. Nos. teach the combination of mineral wool and cellulosic fibers in producing a board: Isidor Kitsee 1,910,469; Albert L. Clapp 2,273,313; R. C. Sproull et al 2,504,744; Don M. Hawley et al 2,702,241; J. A. Tomlinson 3,004,878; R. T. Jackson 3,012,929; J. M. Hella et al 3,093,533; J. H. Waggoner 3,236,719.

Cellulosic fibers, for example in amounts of up to about 25 to 35% by dry weight of the product, do not affect the fire retardancy of a mineral wool board substantially so that Class I flame resistant boards can be produced having increased strength. However, until the process of the present invention, it has not been possible to provide a mineral wool fiberboard having the strength, scratch-resistance and decorative surface quality required for wall paneling.

Various binders have been used to bond mineral fiber products. Commonly, a resin such as phenol-formaldehyde is used, sometimes mixed with one or more binder extenders. The binder and binder extenders are added to the mineral fiber before the initial formation or consolidation of the board into a unitary structure and are cured in drying and/or initial pressing to set the board into its final shape or configuration. The bonding forces created during this initial consolidation are generally quite powerful and, prior to the present invention, it has been impossible to re-shape a consolidated mineral wool board because of the bonding caused by the cellulosic fibers, as described in our above-identified co-pending application, and because of the cured binders and due to the brittleness of the mineral fibers.

The Ashall et al U.S. Pat. No. 3,790,442 discloses the use of urea as a binder extender in the initial formation of a mineral wool board and the Sarjeant U.S. Pat. No. 3,285,801 discloses urea in forming a lignin-urea-phenol aldehyde thermosetting resin for use as a binder in manufacturing mineral wool boards. Neither of these patents, however, discloses the use of urea in a "post-press" or "after consolidation" hot-press step as disclosed herein to be necessary for skin formation.

SUMMARY OF THE INVENTION

In brief, and in accordance with an important feature of the present invention, mineral wool, containing cellulosic fibers and/or starch, can be re-shaped in a post-press or post-consolidation hot-pressing step by first contacting the surface of the board with urea and thereafter hot-pressing the previously consolidated board at a temperature of at least 525° F., and preferably in the range of 550°-600° F. The post-consolidation hot-pressing step, surprisingly, not only permits effective and accurate re-shaping of the consolidated glass fiber containing board, but also creates a strong, hard, dense, scratch-resistant "skin" on the board surface enabling the boards to be used for wall panelling. Accordingly, an object of the present invention is to provide a method of re-shaping a consolidated cellulosic fiber or starch containing, mineral wool or other glass fiber-containing board by contacting at least the surface of the board with urea and thereafter "post-press" or "post-consolidation" hot-pressing the consolidated board at a temperature of at least 525° F.

Another object of the present invention is to provide a method of "post-consolidation" embossing a predominantly mineral wool fiber board by applying urea to at least one major surface of the board, prior to post-consolidation embossing at a temperature of at least 525° F., to achieve surprisingly accurate design fidelity in the embossed surface of the board.

Another object of the present invention is to provide a relatively lightweight mineral wool board having hard, dense surface skins thereon.

Another object of the present invention is to provide a predominantly mineral wool board having a central core of relatively weak mineral wool fibers and having a surface skin on one or both major surfaces formed by contacting cellulosic fibers contained in at least one major surface of a consolidated mineral wool board with urea, in an amount sufficient to form a hard, dense skin on said surface when the consolidated board is thereafter "post-consolidation" pressed at a temperature of at least 525° F.

Another object of the present invention is to provide a method of improving the strength, stiffness, hardenss, surface density, paint holdout, scratch-resistance, breaking load, and design fidelity of a mineral wool board.

Another object of the present invention is to provide a method of providing an integral, structural skin on one or more surfaces of a cellulosic fiber-containing or starch-containing mineral wool by including urea within at least the surface fibers of the consolidated board and thereafter post-consolidation pressing the urea treated consolidated board at a temperature of at least 525° F.

Surprisingly, it has been found that the skin created by post-consolidation pressing a mineral wool board containing cellulosic fibers or starch and having urea in at least the outer surface fibers creates a hard, dense surface which, if desired, effectively and permanently reproduces embossing plate details on the surface of the product and creates a smooth outer surface having excellent holdout of coating materials, such as paint. The post-consolidation pressing operation restructures the surface fibers contacted with urea to provide exceptional strength and stiffness properties to a mineral wool board.

These and other objects and advantages of the present invention will become apparent from the following detailed description of the present invention.

DETAILED DESCRIPTION OF THE INVENTION

Consolidated Mineral Wool Board

In accordance with the present invention, a high strength mineral wool board having hard, dense skins or surface portions thereon is manufactured in two steps. The first step comprises manufacturing a consolidated, mineral wool board including cellulosic fibers and/or starch. The second step comprises post-pressing the consolidated mineral wool board after first treating at least the surface fibers of the mineral wool board with urea to form a skin on one or both major surfaces of the product.

The method of producing a consolidated mineral wool board is well known, as described in the above-listed patents. In the wet process, the mineral fibers, and usually a combination of mineral fibers and cellulosic fibers, are uniformly blended with copious quantities of water and one or more binders to form a slurry. The slurry is deposited onto a water-pervious support member, generally a Fourdrinier wire, where much of the water is removed leaving a wet mat of mineral wool and binders or a combination of mineral wool and cellulosic fibers. The wet mineral wool mat is then dried to consolidate the board.

The mineral wool mat containing cellulosic fibers to be treated with urea and "post-press" or "after-consolidation" embossed in accordance with the present invention can be manufactured in a conventional manner, using conventional mineral wool fiber stock. Mineral wool boards manufactured commercially today contain approximately 25% cellulosic fibers for the purpose of strength and handleability so that the boards are less brittle and therefore less likely to be damaged in manufacture and installation, such as in use as ceiling tiles. These commercially manufactured mineral wool boards are manufactured with the cellulosic fibers substantially uniformly distributed throughout the board. The mineral wool generally is blended with cellulosic fibers such as kraft pulp, wood pulp screenings, newsprint pulp, cotton fiber, rag fiber, or some other form of cellulosic fiber to take advantage of the bonding strength of cellulosic fibers in addition to the fire-resistant quality of mineral wool. Typically, additional binders such as starch, chemically modified starches, phenol-formaldehyde or other artificial resin binders, sodium silicate, glue, casein, rubber latex, aqueous rubber dispersions or emulsions, asphalt emulsions, or combination thereof, are used in the manufacture of mineral wool boards to achieve the strength necessary for purposes such as ceiling tiles and the like. In accordance with the present invention, the consolidated mineral wool board containing cellulosic fibers and/or starch can be prepared by incorporating one or more of these binders to increase the strength of the mineral wool board and thereafter hot-pressing at a temperature of at least 525° F. A typical formulation for mineral wool, useful in accordance with the present invention, on which skins can be formed by applying urea and hot-pressing at a temperature of at least 525° F., is as follows:

mineral wool: 56.1%
hickory clay: 14.15%
newspaper: 5.20%
starch: 8.53%
expanded perlite: 15.60%
fungicide (i.e. DOWICIDE): 0.01%
copper sulfate: 0.006%
retention aid (i.e. RETEN): 0.21%
defoamer: 0.10%

Practical considerations dictate that the mineral wool board should contain cellulosic fibers for the purpose of adding strength to the central core of the board manufactured in accordance with the present invention. However, it has been found that both cellulose and starch will react or interact with urea in the high temperature post-consolidation hot-press step disclosed herein to provide a hard, dense skin on the surface of the board. Since both cellulose and starch are polymers containing repeating glucose units, it is theorized that the formation of the skin, in accordance with the present invention, is due to reaction of urea or its decomposition products with one or more units of the cellulose and starch monomers to form a hard, dense polymeric reaction product. Applications, however, have been unable to determine the composition of the surface skin by analysis.

Accordingly, provided that other binders are included in the mineral wool board in an amount sufficient to provide adequate strength to the central core of mineral wool fibers, cellulosic fibers need not be included with the mineral wool fibers in manufacturing the consolidated mineral wool board for urea treatment and post-consolidation high temperature pressing. If surface cellulosic fibers are not included in the manufacture of the mineral wool board, starch should be included in at least the surface layer (herein defined as an outer 0.030 inch major surface layer), and preferably in both the top and bottom surface layers, in an amount of at least about 10% and preferably 15–25% based on the total weight of the surface layer prior to post-consolidation hot-pressing at a temperature of at least 525° F. With increasing amounts of cellulosic fiber in the surface of the mineral wool board the strength, design fidelity, paint holdout, surface hardness, and skin thickness improves.

In accordance with another embodiment of the present invention, the consolidated mineral wool board can have cellulosic fibers concentrated at one or both major surfaces, such as by applying a paper overlay on one or both major surfaces of the mineral wool board. The paper overlay(s) then can be impregnated with urea, such as by direct roll coater application, and the consolidated mineral wool board having one or more paper overlays, and including urea in the overlay(s), then in hot-pressed at a temperature of at least 525° F. to form skin(s) on the board and substantially increase the strength, hardness, scratch-resistance, paint holdout, surface density, design fidelity and buckle resistance. The paper overlay can be applied in any manner known in the art, such as by using multiple offset head boxes—the first head box preferably laying down a mat containing at least 5% cellulosic fibers, a middle head box laying down predominantly mineral wool fibers and the last head box overlaying a mat including at least 5% cellulosic fibers. Alternatively, paper sheets, preferably having a thickness of at least 0.009 inch, can be applied over one or both major surfaces of a consolidated mineral wool board. The paper overlay(s) can be impregnated with urea either before or after applying the overlay(s) to the mineral wool board, and the multiple layer consolidated board then is hot-pressed at a temperature of at least 525° F. to form the skins. Consolidated mineral wool boards of varying thicknesses can be produced in accordance with known technology to provide relatively lightweight core materials on which a surface skin can be developed in accordance with the following disclosure.

Skin Development

The consolidated mineral wool mat having cellulosic fibers and/or starch in one or more major surfaces and containing urea is pressed in a post-consolidation pressing operation at a temperature of at least 525° F. to develop a surface layer herein called a "skin", defined as an outer layer having a higher density than a thickness of material over which it is formed. It was found that heat and pressure alone (without urea) would not form a thick skin on the surface of a mineral wool board. Skin thickness was very thin regardless of the temperature and compression, c.f. our prior co-pending application Ser. No. 739,189 filed Nov. 5, 1976.

The urea should be applied in a minimum amount of about 5% based on the dry weight of total surface layer contacted with urea to create a skin having an average skin thickness of about 0.030 inch. Accordingly, to achieve an average skin thickness of about 0.030 inch, urea should be applied to the surface layer of the mineral wool board in an amount of at least 5 pounds of urea per thousand square feet of board surface area. In accordance with an important feature of the present invention, a skin can be formed having an average thickness up to about 0.030 inch by including urea in the surface fibers in an amount of at least 10 pounds of urea per thousand square feet of board surface area. As set forth in our co-pending application Ser. No. 739,184 filed Nov. 5, 1976, urea can be impregnated into the surface of the consolidated fiberboard mat by vacuum impregnation to provide average skin thicknesses on the order of 0.060–0.075 inch. This same vacuum impregnation technique can be used in accordance with the present invention to achieve greater skin thickness. To achieve the full advantage of the present invention so that maximum skin thickness can be achieved, the urea should be applied in an amount of at least 20 pounds of urea per thousand square feet of board surface area and generally in the range of 20–100 pounds of urea per thousand square feet of board surface area. Generally, any increase in the amount of urea beyond about 100 pounds of urea per thousand square feet of surface area will not appreciably (if at all) increase the skin thickness formed in the post-consolidation pressing step. After urea impregnation, it is desirable to dry the impregnated board to about 10% or less moisture content prior to post-pressing.

POST-CONSOLIDATION PRESS CONDITIONS

The consolidation mineral wool board is "post-consolidation" pressed at a temperature of at least 525° F. To achieve the full advantage of the present invention, the temperature of "post-pressing" should not exceed 650° F. It is preferred to "post-press" at a temperature in the range of 525°–575° F.

To maintain a relatively low density, relatively thick core of mineral wool material in the board, the pressure used in "post-consolidation" pressing should not exceed about 100 p.s.i. Higher pressures can be used if more dense, thinner boards are desired. Pressures can vary depending upon desired caliper and density of the board product, but it is preferred to use pressures on the order of 30–100 p.s.i. in post-consolidation pressing. It is desirable to use a post-consolidation pressure less than about 100 p.s.i. when sound absorptive, heat insulative characteristics are required. The time of post-consolidation pressing is not critical and preferably is in the range of 5–60 seconds. With higher temperatures in the range of 575°–650° F., it is desirable to remove the product from the post-consolidation press operation within about 30 seconds to avoid charring or decomposition of the surface skins.

The mineral wool product formed by the process of the present invention includes a hard, dense, smooth skin having a density in the range of 40–55 pounds/ft$^3$, generally about 50 pounds/ft$^3$. The composition of the skin cannot be determined by analysis.

Although the present invention is described in terms of particular constituents, and ranges thereof, and manner of making and using the same, it is recognized that departures may be made therefrom within the scope of the invention as defined in the appended claims.

We claim:

1. A mineral wool-containing fiberboard product comprising a base layer including mineral wool fibers and a binder selected from the group consisting of cellulosic fiber, starch, and mixtures thereof, and an integral skin disposed on at least one surface of said base layer, said skin having a density in the range of 40–55 pounds/ft$^3$ and formed by including said binder in a surface layer in an amount effective to form said skin and contacting said cellulosic fibers or starch in said surface layer with urea in an amount of 5–20% based on the dry weight of said surface layer contacted therewith, and, after consolidation of said base layer, heating said contacted surface layer, under pressure above ambient, at a temperature of at least 525° F., said skin formed during said hot-pressing on the surface layer contacted with urea.

2. A method of manufacturing a mineral wool board having a skin on at least one surface thereof comprising:
consolidating a fibrous mat containing mineral wool fibers and a binder selected from the group consisting of cellulosic fiber, starch, and mixtures thereof to form a consolidated mineral wool board said cellulosic fiber or starch included in the surface of said consolidated board in an amount effective to form a skin on said surface;
including urea in at least a surface layer of said board in an amount of at least 5% based on the dry weight of said surface layer; and
hot-pressing said consolidated board containing urea in at least its surface fibers, at a temperature of at least 525° F. to form a mineral wool containing board having a skin on at least one surface thereof, said skin defined by a layer of material on said surface of said board having a density greater than the material on which the skin is formed, said skin formed during said hot-pressing on the surface of said board including urea.

3. A method as defined in claim 2 wherein said consolidated board is formed by including urea in the surface fibers as an overlay, said method further comprising depositing a first layer of fibers to form a core of fibers; depositing a second layer of fibers, containing urea therewith, over said core of fibers whereby said second layer of fibers intermingles with said core of fibers such that said second layer of fibers containing urea becomes an integral part of said core of fibers; consolidating said first and second layers to form a consolidated board; and thereafter hot-pressing said consolidated board at a temperature of at least 525° F.

4. A method as defined in claim 3 wherein said second layer of fibers contains urea in an amount of at least 5% based on the dry weight of said second layer.

5. A method as defined in claim 2 wherein said urea containing consolidated board is hot-pressed at a temperature in the range of 525°–650° F.

6. A method as defined in claim 2 wherein said board contains at least 5% cellulosic fibers in a surface layer comprising a thickness of 0.030 inch.

7. A method as defined in claim 2 wherein said binder is cellulosic fibers and wherein said cellulosic fibers are included in said surface layer in an amount of at least 5% based on the dry weight of said surface layer.

8. A method as defined in claim 2 wherein said binder is starch and wherein said starch is included in said surface layer in an amount of at least 10% based on the weight of said surface layer.

9. A method of forming a mineral wool-containing board having a relatively dense skin on at least one of its surfaces comprising:
applying urea to a surface of a consolidated mineral wool-containing board containing at least 5% by weight cellulosic fibers in said surface, said urea applied in an amount of at least 5 pounds of urea per thousand square feet of surface contacted with said urea to form a urea treated consolidated board; and
pressing said urea treated consolidated board at a temperature of at least 525° F., said skin formed during said hot-pressing on the surface of said mineral wool-containing board containing urea.

10. A method as defined in claim 9 wherein said urea treated consolidated board is pressed at a temperature in the range of 525°–650° F.

11. In a method of manufacturing a mineral wool-containing fiberboard, including the steps of hot-pressing a mineral wool-containing fiberboard mat, containing at least 5% by weight cellulosic fibers in a surface thereof, to consolidate said mat into a unitary structure to form a consolidated mineral wool fiber-containing board, the improvement comprising impregnating said surface of said consolidated board with urea by applying urea in an amount of at least 5 pounds of urea per thousand square feet of said surface and thereafter hot-pressing said impregnated, consolidated board at a temperature of at least 525° F. for a period of time sufficient to form a hard, dense skin on the surface of said board, said skin formed during said hot-pressing on the surface of said board impregnated with urea.

12. In a method as defined in claim 11 including hot-pressing said impregnated, consolidated board at a pressure not exceeding 200 p.s.i.

13. In a method as defined in claim 12 including hot-pressing said impregnated, consolidated mat at a pressure in the range of 30–200 p.s.i.

14. A method of forming a hard, dense skin on the surface of a mineral wool fiber-containing board, having at least 5% by weight cellulosic fibers in said surface, and containing a binder, comprising:
contacting said surface of said mineral wool fiber-containing mat with urea in an amount of at least 5% based on the dry weight of the surface portion of the mat contacted with said urea;
consolidating said mineral wool fiber-containing board to substantially cure the binder therein and to form a consolidated board; and thereafter
hot-pressing said consolidated board containing urea in a heated press at a temperature of at least 525° F. to form a board having a skin on said surface of said board having a density greater than the density of material on which the skin is formed, said skin formed during said hot-pressing on the surface of said board contacted with urea.

15. A method as defined in claim 14 wherein said urea containing board is hot-pressed at a temperature in the range of 525°–650° F.

16. A method as defined in claim 14 wherein said binder comprises starch.

17. A method as defined in claim 14 wherein said surface fibers are contacted with urea in an amount in the range of 5–20% based on the total dry weight of board material contacted by said urea.

18. A method of manufacturing a mineral wool fiber-containing board containing cellulosic fibers said board having a skin on at least one surface thereof comprising:
depositing a first layer of fibers containing at least 45% mineral wool fibers, based on the dry weight of said first layer to form a base layer for supporting at least one surface skin thereon;
depositing a second layer of fibers over said first layer of fibers, said second layer containing at least 5% cellulosic fibers based on the dry weight of said second layer;
including urea in said second layer of fibers in an amount of at least 5% based on the total dry weight of said second layer of fibers;

consolidating said first and second layers in a heated press at a temperature less than 500° F. to form a consolidated urea-containing mineral wool board; and thereafter hot-pressing said consolidated urea-containing mineral wool board at a temperature in the range of 525°–650° F. to form at least one skin on said base layer, said skin formed during said hot-pressing on the surface of said second layer of fibers.

19. A method as defined in claim 18 further including depositing a third layer of fibers containing at least 5% cellulosic fibers based on the dry weight of said third layer over said base layer, prior to consolidation of said first and second layers, to thereby sandwich said base layer between said second and third layers, and including urea in said third layer in an amount of at least 5% based on the total weight of said third layer: and consolidating said three layers and thereafter hot-pressing at a temperature in the range of 525°–650° F.

20. A method as defined in claim 19 wherein the amount of urea in each of said second and third layers is in the range of 9–17% by dry weight of each of said second and third layers.

21. A method as defined in claim 2 wherein said surface layer includes a depth of material underlying said surface a depth of 0.030 inch.

22. The product as defined in claim 1 wherein said base layer is consolidated by heating said base layer to dry the base layer and set the binder.

23. The product as defined in claim 22 including consolidating said base layer prior to contacting said surface layer with urea.

24. A method as defined in claim 2 wherein said board contains at least 50% mineral wool fibers.

25. A method of manufacturing a mineral wool board having a skin on at least one surface thereof comprising:
consolidating a fibrous mat containing mineral wool fibers to form a consolidated mineral wool base layer;
applying a consolidated paper sheet having at least 5% by weight cellulosic fibers over at least one major surface of said base layer;
impregnating at least a portion of said paper sheet with urea;
hot-pressing said base layer having said impregnated paper sheet thereon at a temperature of at least 525° F. to form a mineral wool board having a skin thereon, said skin formed during said hot-pressing on the paper sheet impregnated with urea.

26. A method as defined in claim 25 wherein said paper sheet is impregnated with urea in an amount in the range of 5–20% by dry weight of said sheet prior to applying said paper sheet over said base layer.

27. A method as defined in claim 25 wherein urea is applied to said paper sheet in an amount of at least 5 pounds of urea per thousand square feet of paper sheet surface area after said sheet has been applied over said base layer.

28. A method as defined in claim 25 wherein said paper sheet is secured to said base layer with a binder.

29. A method as defined in claim 28 wherein said binder comprises starch.

30. A method as defined in claim 28 wherein said binder comprises urea.

31. A method as defined in claim 25 wherein said paper sheet is secured to said base layer during said hot-pressing.

32. A method as defined in claim 28 wherein said binder is disposed between said base layer and said paper sheet by coating said base layer therewith.

33. A method as defined in claim 28 wherein said binder is a mixture of urea and lignin sulfonate.

34. A method as defined in claim 28 wherein said binder is disposed between said base layer and said paper sheet by coating a base layer contacting surface of said paper sheet with said binder.

35. A method as defined in claim 32 wherein said binder is sprayed over a paper sheet contacting surface of said base layer before applying said paper sheet.

36. A method of manufacturing a cellulosic fiber-containing board having a skin on at least one surface thereof comprising:
dry depositing a layer of fibers including mineral wool fibers and a binder selected from the group consisting of cellulosic fibers, starch, and mixtures thereof onto a support member to form a loose mat containing mineral wool fibers, said cellulosic fibers or starch included in the surface of said loose mat in an amount effective to form a skin on said surface;
consolidating said mat to bond said mineral wool fibers together to form a completed board;
contacting at least a surface of said completed bond with urea in an amount sufficient to form a surface portion having a density greater than the density of the material on which the skin is formed; and
hot-pressing said contacted surface at a temperature of at least 525° F. to form a skin, said skin formed during said hot-pressing on the surface of said mineral wool board contacted with urea.

37. A method as defined in claim 36 further including drying said urea contacted mat prior to hot-pressing said contacted surface.

38. A method of manufacturing a mineral wool fiber containing board having a skin on at least one surface thereof comprising:
dry depositing a layer of fibers including mineral wool fibers and a binder selected from the group consisting of cellulosic fiber, starch, and mixtures thereof onto a support member to form a loose mat said cellulosic fibers or starch included in the surface of said loose mat in an amount effective to form a skin on said surface;
contacting at least a surface of said mat with urea in an amount sufficient to form a surface portion having a density greater than the density of the material on which the skin is formed;
consolidating said urea contacted mat to bond said mineral wool fibers together to form a completed mineral wool board; and
hot-pressing said completed board at a temperature of at least 525° F. to form a skin, said skin formed during said hot-pressing on the surface of said mineral wool board contacted with urea.

39. A method as defined in claim 38 further including contacting a surface on the consolidated board with urea prior to hot-pressing at a temperature of at least 525° 1 F.

* * * * *

UNITED STATES PATENT AND TRADEMARK OFFICE
CERTIFICATE OF CORRECTION

PATENT NO. : 4,175,149
DATED : November 20, 1979
INVENTOR(S) : Allan J. Luck, John T. Clarke, Michael R. Hoffman It is certified that error appears in the above-identified patent and that said Letters Patent are hereby corrected as shown below:

Column 9, claim 27, line 55 change --ure-- to --urea--

Column 10, claim 36, line 29 change --bond-- to --board--

Column 10, claim 39, line 62 should read --contacting a surface of the consolidated board with--

Column 10, claim 39, line 64 should read --525° F.--

Signed and Sealed this

Twenty-sixth Day of February 1980

[SEAL]

Attest:

SIDNEY A. DIAMOND

Attesting Officer

Commissioner of Patents and Trademarks